United States Patent [19]

Dressler

[11] Patent Number: 4,849,769

[45] Date of Patent: Jul. 18, 1989

[54] SYSTEM FOR ULTRASONIC CLEANING OF INK JET ORIFICES

[75] Inventor: John L. Dressler, Spring Valley, Ohio

[73] Assignee: Burlington Industries, Inc., Greensboro, N.C.

[21] Appl. No.: 56,773

[22] Filed: Jun. 2, 1987

[51] Int. Cl.[4] .............................................. G01D 15/18

[52] U.S. Cl. ....................................... 346/1.1; 346/75; 346/140 R

[58] Field of Search ....................... 346/1.1, 75, 140 R; 134/1; 366/114, 115, 127

[56] References Cited

U.S. PATENT DOCUMENTS

| | | | |
|---|---|---|---|
| 3,113,761 | 12/1963 | Platzman | 366/115 |
| 3,208,731 | 9/1965 | Gams et al. | 366/114 |
| 3,572,352 | 3/1971 | Koopman | 134/122 |
| 3,901,726 | 8/1975 | Snearly | 134/1 |
| 4,007,465 | 2/1977 | Chaudhary | 346/140 R |
| 4,050,078 | 9/1977 | Isayama et al. | 346/140 R |
| 4,123,761 | 10/1978 | Kumura et al. | 346/140 R |
| 4,178,188 | 12/1979 | Dussault et al. | 134/1 |
| 4,193,818 | 3/1980 | Young et al. | 134/1 |
| 4,296,418 | 10/1981 | Yamazaki et al. | 346/75 |
| 4,369,456 | 1/1983 | Cruz-Uribe et al. | 346/140 R |
| 4,371,881 | 2/1983 | Bork et al. | 346/140 R |
| 4,372,787 | 2/1983 | Fields et al. | 134/1 |
| 4,375,991 | 3/1983 | Sachs et al. | 134/1 |
| 4,563,688 | 1/1986 | Braun | 346/1.1 |
| 4,600,928 | 7/1986 | Braun et al. | 346/1.1 |

*Primary Examiner*—E. A. Goldberg
*Assistant Examiner*—Gerald E. Preston
*Attorney, Agent, or Firm*—Nixon & Vanderhye

[57] ABSTRACT

An apparatus for cleaning foreign particles from an ink jet orifice plate assembly having a plurality of orifices and an ink stream input passage includes a liquid reservoir containing a quantity of cleaning liquid in which the ink jet orifice plate/dye cavity assembly is disposed, ultrasonic agitation means for imparting ultrasonic vibrations in the liquid to dislodge foreign particles from the orifice plate assembly, and means for simultaneously propelling a stream of the cleaning fluid inwardly (in a reverse-flow manner) through the plurality of outlet orifices to carry off dislodged foreign particles. The solid particulates are thereby removed from the assembled structure before it is placed in operation in the fluid jet printer. The method for ultrasonic cleaning is also disclosed.

17 Claims, 2 Drawing Sheets

SYSTEM FOR ULTRASONIC CLEANING OF INK JET ORIFICES

FIELD OF THE INVENTION

The present invention relates to noncontact fluid printing devices conventionally known as "ink jet" or "fluid jet" printers and, more particularly, to a method for ultrasonically cleaning solid particles, dried ink or other contaminants from the fluid supply system, print head and orifice plate through which the ink jet droplets emerge.

BACKGROUND AND SUMMARY OF THE INVENTION

Noncontact printers which utilize droplets emitted from an orifice plate are generally known in the art as shown by U.S. Pat. Nos. 3,373,437 to Sweet et al; 3,560,988 to Crick; 3,579,721 to Kaltenbach; and 3,596,275 to Sweet. Typically, fluid filaments of ink, dye or the like (hereinafter "fluid") pass through the orifices of an orifice plate, and a first array of individually controllable electrostatic charging electrodes are disposed downstream of the orifice plate along a "droplet formation zone" to selectively charge droplets of the fluid. The droplets subsequently pass through an electrostatic field which deflects the charged ones of the droplets from the normal path towards a droplet catcher. Uncharged droplets proceed along a normal path and are deposited upon a receiving substrate.

Typically, noncontact ink jet or "fluid jet" printers use a solvent-based ink or dye medium which contains water as the principal component. Many of the dye compositions used in fluid jet printing operations are formed by dissolving a solid dye material in the aqueous solvent medium. In other compositions, the fluid is comprised of a dispersion of fine particles in a liquid, such as disperse dyes commonly used in dyeing textiles. Typically, the ink supply system for the printer includes a fluid reservoir or supply chamber disposed above the orifice plate which connects to a fluid manifold assembly. The manifold distributes an even flow of printing fluid across the linear array of orifices and is generally secured to the orifice plate by using mounting clamps, brackets or the like. Once assembled, the manifold and orifice plate define a "dye cavity" for the dye medium used during the print operation. In this regard, the present method and apparatus for ultrasonically cleaning the fluid jet components is particularly useful for cleaning the orifice plate/dye cavity structures described and claimed in commonly-owned U.S. application Ser. No. 750,589, the disclosure of which is hereby incorporated by reference.

During the assembly of the orifice plate and manifold structure, tiny metal particles, dust or other solid particulates may become trapped in the assembly at or near the bearing and seating surfaces for metal components, particularly when the clamps are tightened against the orifice plate. The particles are thereafter introduced into the dye cavity and/or the openings of the orifice plate itself. In addition, during normal operation of the fluid jet printer, particles of dried ink or disperse dye may become lodged in or adjacent to the orifices or even collect on the inside surfaces of the fluid reservoir, dye cavity and related parts of the print head assembly.

The problem of solid particulates in the fluid becomes particularly significant in fluid jet devices in which certain of the droplets not deposited on the print substrate are caught by a catcher structure (or "gutter" assembly). The so-caught fluid droplets (containing undesired solid particulates) are usually recirculated to the fluid supply system for reuse in a subsequent printing operation. Invariably, contaminants such as dust, lint and the like are introduced into the fluid supply system and are not removed by conventional fluid filtration means. Such solid particulates may "settle out" and attach to portions of the fluid supply system forming undesired deposits.

Particles within the deposits may also break loose and migrate to other portions of the fluid supply system causing clogging or contamination. In particular, the solid particles in the fluid may block or partially hinder the flow of fluid through one or more of the orifices, Obviously, if an orifice is partially or totally blocked, the normal throughput of fluid for deposition on the substrate may change. In addition, a blocked orifice may result in imperfect droplet trajectories and/or variations in the charging/deflection mode of the printer, thereby reducing the accuracy of placement of the droplet on the substrate. In printing or dyeing operations this could result in quality degradation.

Recently, it has been proposed to utilize a fluid jet apparatus as a means to print patterns or the like on textile materials, such as the fluid jet printing device disclosed in commonly-owned U.S. Pat. No. 4,523,202, the disclosure of which is also expressly incorporated herein by reference. Fine printing of patterns on a textile substrate is achieved by the use an orifice plate having at least one linear array of very small orifices sized in the range of, for example, 0.00035 to 0.020 inches in diameter equally spaced from one another on the order of fifty to two hundred per inch. It is highly desirable in the use of such small diameter, high density orifices spaced for purposes of forming print patterns on textile substrates that any particles or residue which might otherwise clog an orifice or change its configuration be eliminated or reduced to an absolute minimum.

A number of methods have been used in the past for cleaning an ink jet printing head without removing the print head from the printing structure, such as those shown by U.S. Pat. Nos. 4,007,465 and 4,276,554. In addition, various approaches have been used for providing an ultrasonic vibration to assist in dislodging trapped solid particles at or near the orifice openings. Certain arrangements, for example, increase the ink pressure upstream of the orifice while vibrating a nozzle or orifice structure. Other proposals use vibration means coupled with heat at or near the nozzle or orifice.

However, none of the prior arrangements are entirely effective for removing particles or residues which might otherwise block the orifice openings, particularly under circumstances where the orifice plate uses small, closely-spaced orifice openings. In particular, the prior devices are incapable of preventing ink clogs caused by contaminants introduced, for example, when the orifice plate is initially fastened to the manifold assembly before being placed in operation, or during a routine maintenance function such as when a filter for the fluid supply is replaced without shutting down and cleaning the entire fluid supply system. For closely-spaced, high density orifice plate structures, the prior methods of ultrasonic cleaning are also ineffective in removing solidified ink which forms ink deposits during long periods of non-use, or the fine dust particles and atmospheric impurities in the ink supply which may ultimately cause the entire ink jet head to malfunction or perform to a degree that is less than satisfactory. Prior methods and apparatus are particularly unsuited for cleaning orifice plate assemblies for textile applications in which the orifice array is on the order of 1.8 meters long.

It has now been found that the above problems relating to the clogging of orifices in fluid jet devices may be substantially eliminated by the method and apparatus according to the present invention. In particular, applicant has discovered a method for cleaning the ink jet printing orifices of the orifice plate of a printing head which serves as the final step in the initial assembly of the print head, i.e., at the critical time when small, solid particulates are generated by the assembly process itself. In essence, the improved method of ultrasonic cleaning according to the invention includes the steps of placing the orifice plate/dye cavity assembly into a tank containing a quantity of cleaning fluid. The tank is then agitated at a ultrasonic frequency to cause cavitation of the cleaning fluid, thereby dislodging foreign particles from the entire orifice plate/dye cavity assembly. Simultaneously, a filtered fluid stream is directed through the orifices of the orifice plate in a direction opposite the normal flow of fluid through the orifices by pumping cleaning fluid out through ink supply inlets on the opposite side of the orifice plate/dye cavity assembly. The combination of ultrasonic fluid cavitation and reverse flow causes particles to be dislodged from the orifices and the ink/dye cavity. The solid particulates are then carried by the reverse-directed fluid stream away from the orifices and out of the inlet tubes of the dye manifold so that they cannot fall back toward the orifices themselves. The dislodged solid particulates on the exterior of the orifice plate/dye cavity assembly may be removed through a separate cleaning fluid outlet in the ultrasonic agitation tank itself or through the orifices into the cavity to be carried off by the reverse-directed fluid stream. Alternatively, the exterior may be cleaned before the interior.

INFORMATION DISCLOSURE STATEMENT

Various methods and apparatus for providing ultrasonic cleaning of devices, including fluid jet manifolds and nozzle structures, are evidenced by U.S. Pat. Nos. 3,572,352 to Koopman; 4,178,188 to Dussault et al; 4,296,418 to Yamazaki et al; 4,007,465 to Chaudhary; 4,369,456 to Cruz-Uribe et al; 4,371,881 to Bork et al; 4,123,761 to Kimura et al; 4,050,078 to Isayama et al; 4,375,991 to Sachs et al; 3,208,731 to Gams et al; 3,901,726 to Snearly; 4,563,688 to Braun; 4,193,818 to Young et al; 4,372,787 to Fields et al; 3,113,761 to Platzman; 4,600,928 to Braun et al.

Koopman '352 discloses a permanent cleaning vessel containing a cleaning fluid and means for directing the flow of cleaning fluid through a fixed passageway defined in the vessel through which a strip material to be cleaned also passes in the same direction. An ultrasonic generator transmits sonic energy into the fluid in the passageway to clean the strip of material moving therethrough.

Dussault et al '188 teaches spraying a solvent stream onto the surface of a rotating workpiece while applying an ultrasonic frequency to the workpiece to induce cavitation of the sprayed solvent film on the workpiece.

Yamazaki et al '418 discloses a solvent tank containing a quantity of pressurized solvent which communicates with a cap through a filter. The cap is engaged with the orifice and pressurized solvent flows from the cap through the nozzle and into a tank on the ink supply side of the nozzle and into a tank on the ink supply side of the nozzle to dissolve clogged ink in the nozzle. Pressurized air is then applied to the nozzle to purge solvent from the nozzle.

Chaudhary '465 discloses a cross-flow of ink pressure within the dye manifold to dislodge any soft clogs from the nozzle orifices. The reference teaches discontinuing operation of the perturbation voltage source during unclogging.

Cruz-Uribe et al '456 disclose an ink jet recorder having a cleaning belt which is positioned so as to contact the orifice plate to wipe it clean. Cleaning of nozzles is accomplished by the flow of ink out of the nozzles due to capillary wicking.

Bork et al '881 and Kimura et al '761 both disclose cleaning orifices by increasing ink pressure through the orifices to dislodge foreign particles and dried ink.

Isayama et al '078 disclose ejecting a solvent through an ink jet printing nozzle from the ink supply side to the ink ejection side of the nozzle to remove ink deposits clogging the nozzle.

Sachs et al '991 teach a method for cleaning deposits from a heat exchanger comprising banks of pipes situated in a water environment. A sonic cleaning transducer is coupled to the banks of pipes to remove deposits from the outer surfaces of the pipes.

Snearly '726, Young et al '818, Fields et al '787 and Platzman '761 are indicative of the generally state of the art of ultrasonic cleaning.

Braun '688 utilizes a transducer to provide vibrational energy to the orifice plate coupled with fluid "flushing" in a direction generally parallel to the orifice plate.

Gams et al '731 disclose agitating dry workpieces in a tank and subsequently rinsing the particles removed from the workpieces with a fluid.

Braun et al '928 disclose cross-flowing ink in an orifice cavity, with a thin layer of ink on the outside of the orifice plate, while applying ultrasonics to effect cleaning.

The present invention deviates from the above methods and structures in that it effectively eliminates clogging problems associated with closely-spaced, high density orifice plate configurations. Unlike prior arrangements, applicant's method and apparatus utilizes reverse flushing of the orifice by fluid flow, coupled with the simultaneous application of ultrasonic waves to cause cavitation of the cleaning fluid at or near the orifice plate. Applicant's claimed method and apparatus also have particular advantages as the final step in the assembly of an ink jet printing head.

Thus, it is an object of the present invention to provide for an improved method and apparatus for ultrasonically cleaning an orifice structure prior to assembly into the fluid jet printing apparatus.

It is a further object of the present invention to provide for a method and apparatus having means for causing ultrasonically-induced cavitation, together with countercurrent fluid propelling means to effect cleaning of small diameter, high density orifices used in fluid jet apparatus.

It is still a further object of the present invention to provide for an improved method for cleaning orifices which have been in operation in a fluid jet device for an extended period of time and/or have become inoperative or inefficient due to the presence of solid particles or deposits in or around the orifices.

These and other objects of the present invention will become more clear by specific reference to the following discussion and appended drawings.

BRIEF DESCRIPTION OF THE ACCOMPANYING DRAWINGS

DETAILED DESCRIPTION OF THE PRESENTLY PREFERRED EXEMPLARY EMBODIMENT

Figure 1:
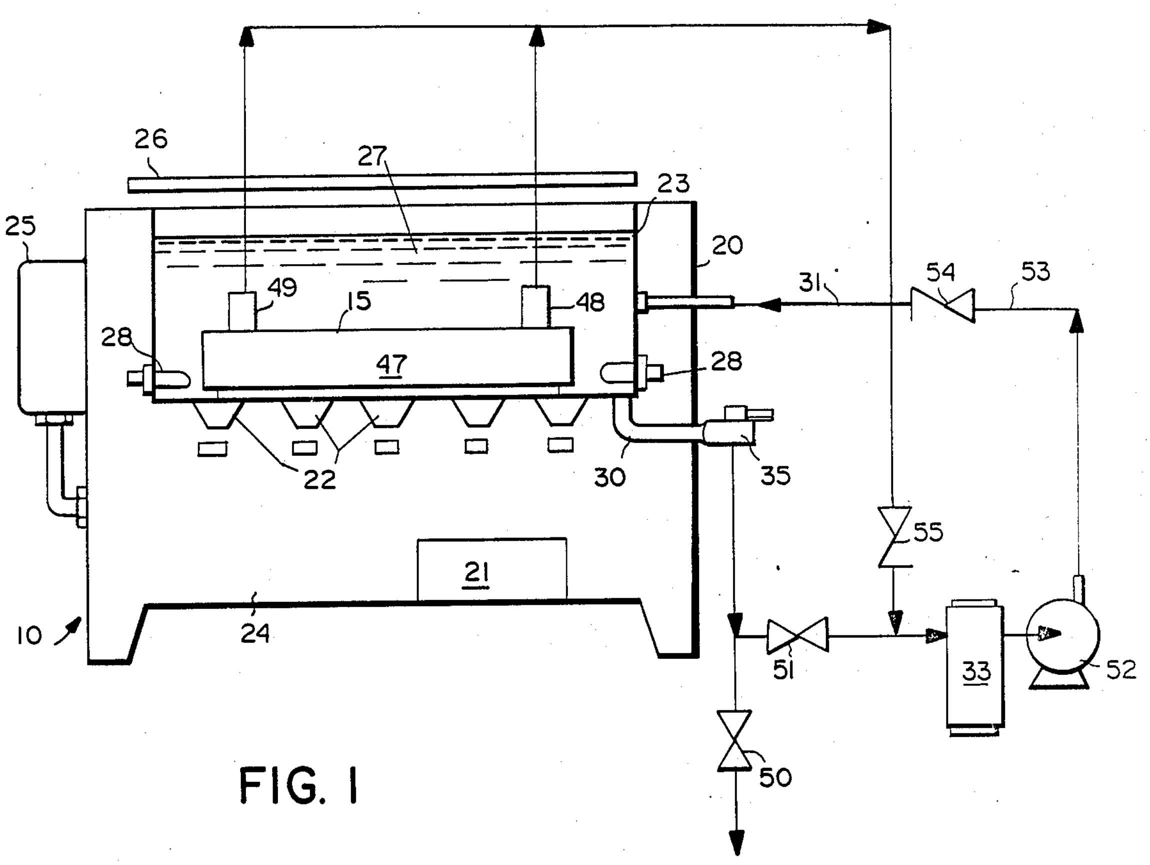
FIG. 1 is a schematic elevational view, taken in cross-section, of an exemplary ultrasonic cleaning device in accordance with the present invention.

As indicated above, the improved apparatus for cleaning foreign particles from an ink jet orifice plate assembly in accordance with the present invention is particularly useful for assemblies which include high density orifice plates having a plurality of closely-spaced orifices and which utilize an ink stream input passage or ink supply manifold in the orifice plate assembly.

In the preferred embodiment of the present invention, the ink jet orifice plate manifold assembly is placed within a reservoir containing filtered water or other suitable cleaning liquid. Ultrasonic vibration means are provided for ultrasonically agitating and cavitating the liquid within the reservoir at a fluid temperature suitable to cause cavitation (room temperature is usually adequate) and reverse-flow propelling means are connected to the input passage of the orifice plate/dye cavity assembly for purposes of propelling a stream of liquid through the plurality of orifices and out the ink stream in the passage. The simultaneous cavitation and reverse flow causes foreign particles to be ultrasonically dislodged from the orifice plate assembly and carried away.

Applicant's method for cleaning foreign particles from a newly-assembled ink jet orifice plate/dye cavity assembly (which has at least one liquid inlet passage and a plurality of orifices), includes the steps of immersing the newly assembled ink jet head in the cleaning liquid, ultrasonically agitating the liquid and, simultaneously with the agitating step, propelling a stream of cleaning fluid through the orifices and out the inlet passage to thereby propel dislodged foreign particles from the assembled unit.

The ultrasonic vibration means employed in accordance with the present invention may include conventional agitation devices currently available for "ultrasonic washing" operations and are known within the textile industry. Such devices include, for example, the "Ultrasonic Washing Machine" manufactured by Studio Impianti Indistriali, Milan, Italy, and typically comprise a fluid reservoir for housing the cleaning fluid, means for imparting ultrasonic vibrations (ultimately resulting in cavitation of the liquid) to the cleaning fluid, and means for circulating and/or discharging the cleaning fluid from the reservoir chamber. A majority of the ultrasonic devices available in the textile industry operate at frequencies in the range of 10 to 40 KHz and it has been found that the preferred operating frequency for the ultrasonic cleaning method according to the invention is approximately 16 KHz. Typical conventional ultrasonic "washing" devices utilize one or more piezoelectric transducers as the principal means for generating fixed frequency ultrasonic vibrations.

During the simultaneous ultrasonic cleaning and reverse flow operation in accordance with the present invention, the ultrasonic action of the washer causes the filtered water (possibly with detergent) or cleaning solvent to cavitate. That is, a localized small volume of liquid will decompress and vaporize, thereby generating a high number of tiny bubbles within the solvent. Immediately thereafter, the bubbles are recompressed within the fluid chamber by the action of the ultrasonics, dislodging particulate materials in the process. Then, the reverse flow of the cleaning liquid through the orifice plate carries the particulate materials out of the orifice plate assembly. For closely-spaced, high density orifice plates, the use of ultrasonic cleaning techniques in conventional washing equipment alone, without the reverse flow step, will not effectively remove the solid particulates which become entrained in the dye medium or which form in the orifice openings during normal operation or shutdown.

With particular reference to FIG. 1 of the drawings, an exemplary cleaning device according to the present invention is shown generally at 10. An assembled orifice plate and manifold structure are depicted at 15 and are shown in greater detail in FIGS. 3 and 4. FIG. 1 also shows the direction of fluid flow using an exemplary reverse flow fluid propelling means for circulating the cleaning fluid through the orifice plate in a countercurrent manner, i.e., in a direction opposite that for normal printing operations.

The ultrasonic treatment chamber in accordance with the present invention (shown generally at 20 in FIGS. 1 and 2) comprises a housing 24 and cover 26 which defines an inner fluid chamber 23 which holds cleaning medium 27. An ultrasonic generator 21 and plurality of piezoelectric transducers 22 are operatively connected to an electrical control board 25 which set and control the operating frequency, amplitude and waveform of the ultrasonic vibrations within the inner fluid chamber. For maximum efficiency, the transducers are positioned on the sides and bottom of inner fluid chamber 23 (see FIG. 2). In order to maintain the cleaning fluid at the optimum desired temperature, one or more electrical heating units 28 may be provided in the lower section of inner fluid chamber 23 and are controlled by a conventional thermocouple and a fluid temperature control loop (not shown). As will be apparent, chamber 23 must be large enough to hold the orifice plate assembly, which in the case of a textile printing device may be in excess of 1.8 meters long.

Figure 2:
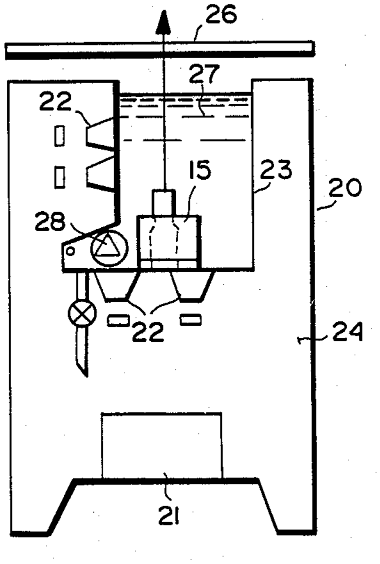
FIG. 2 is an end sectional view of the apparatus depicted in FIG. 1.

FIGS. 1 and 2 also illustrate means for recirculating the cleaning fluid disposed within the inner fluid chamber and the cleaning fluid which is forced through the orifices by the reverse flow fluid propelling means. Fluid exit line 30 from the inner chamber permits the cleaning liquid to flow from the chamber (along with any entrained solid particulates) by gravity flow through valve 35, line 36 and valve 50 to waste. If filtered water is used as the cleaning medium, the fluid supply may be continuously discharged through line 36 without recirculation to the treatment chamber. A continuous supply of fresh water may be supplied to the chamber by way of inlet line 31 and a constant level in the chamber maintained by way of conventional liquid level control means (not shown).

If, however, the cleaning medium consists of a recoverable cleaning solvent or water containing a detergent additive, it may be desirable to recirculate the liquid. Thus, valve 50 is closed, valve 51 is opened and the exit liquid may be recirculated through one or more cartridge type filter units 33 to remove solid particulates, dust and/or dried ink particles. The filtered liquid is then recycled as shown to the inner fluid chamber by way of, for example, a centrifugal cleaning fluid pump 52 in return line 53.

Figure 3:
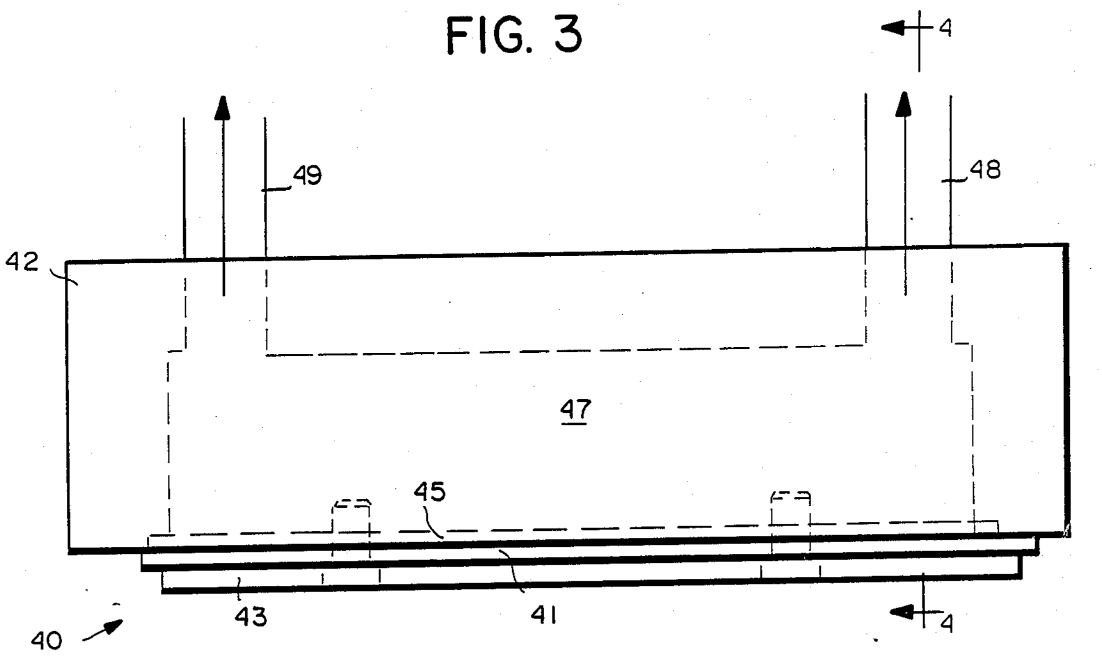
FIG. 3 is an elevational view, taken in cross-section, showing an exemplary orifice plate/dye cavity assembly.
Figure 4:
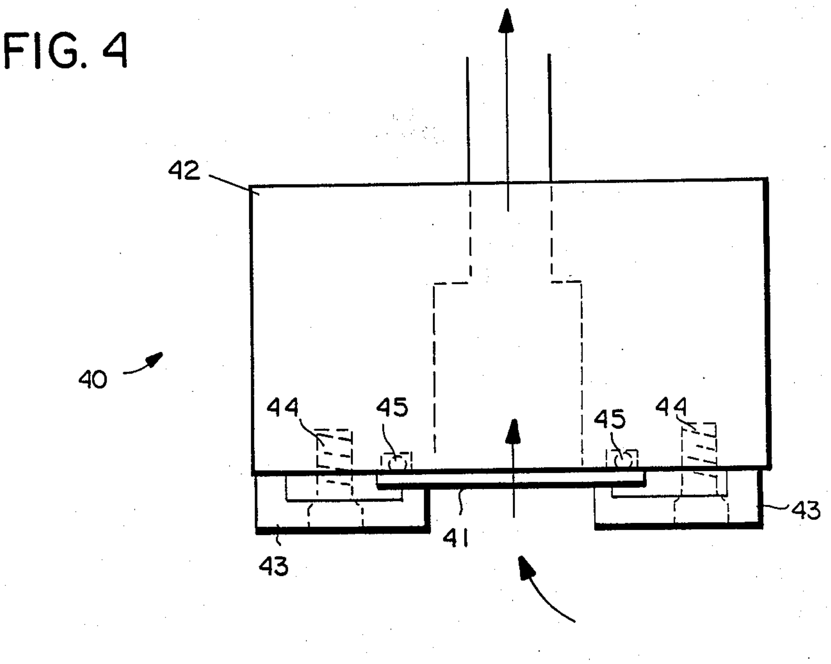
FIG. 4 is a view taken along line 4—4 of the orifice plate/dye cavity assembly depicted in FIG. 3.

A simplified drawing of an exemplary orifice plate/-dye cavity assembly which may be cleaned in accordance with the present invention is depicted in FIGS. 3 and 4 of the drawings. The assembled unit is shown generally as 40, having orifice plate 41 fastened to the dye manifold 42 by means of clamps 43 and threaded to screws 44. A seal such as a neoprene O-ring 45 is provided between the orifice plate 41 and manifold 42. FIG. 3 also shows the dye cavity 47 having inlet openings 48 and 49 which allow for continuous flow of fluid into the cavity to be distributed along the length of the orifice plate in normal printing operations. However, as shown in FIGS. 3 and 4, the flow of cleaning fluid is the reverse of that in normal printing operations, i.e., through the orifices and out the inlet tubes.

An exemplary reverse flow fluid propelling arrangement in accordance with the present invention is also depicted in FIG. 1 of the drawings. Openings 48 and 49 of dye cavity 47 are connected through check valve 55 to the inlet of filter 33. Thus, with valve 51 closed, pump 52 draws fluid through cavity 47, entraining loosened particles which are trapped in filter 33 (as will be apparent, the contaminated fluid could merely be sent to drain, if desired) before being returned to chamber 23 via line 53.

While the present invention has herein been described in what is presently believed to be the most preferred embodiment thereof, those in the art will recognize that many modifications may be made while retaining many of the novel features of the invention, which modifications shall be accorded the broadest scope of the appended claims so as to encompass all of the equivalent structures and/or assemblies.

What is claimed is:

1. An apparatus for cleaning foreign particles from an ink jet orifice plate assembly of the type having a dye cavity, a plurality of outlet orifices and means for causing fluid in said dye cavity to flow outwardly through said orifices, said apparatus, comprising:

liquid containing means for containing a quantity of cleaning liquid, said ink jet orifice plate assembly being disposable in said liquid;

ultrasonic agitating means for ultrasonically agitating said liquid; and liquid stream propelling means for propelling a stream of said liquid inwardly through said plurality of outlet orifices so as to propel foreign particles ultrasonically dislodged from said assembly out of said ink jet orifice plate assembly.

2. An apparatus according to claim 1, wherein said ultrasonic agitating means include a plurality of piezoelectric transducers operably connected to said liquid containing means.

3. An apparatus according to claim 1, wherein said ultrasonic agitating means impart ultrasonic vibrations to said cleaning liquid at the rate of between 10 and 40 KHz.

4. An apparatus according to claim 1 wherein the liquid containing means is longer than 1.8 meters.

5. An apparatus according to claim 1 wherein said ultrasonic agitating means imparts ultrasonic vibrations to said cleaning liquid at the rate of 16 KHz.

6. An apparatus according to claim 1, wherein said cleaning liquid comprises solvent or water having a detergent additive.

7. An apparatus according to claim 1 further comprising heating means and temperature control means for controlling the temperature of said cleaning liquid.

8. An apparatus according to claim 1 further comprising means for filtering said stream of liquid propelled through said plurality of orifices and means for recirculating said filtered liquid to said liquid containing means.

9. A method for cleaning foreign particles from an assembled ink jet orifice plate assembly of the type having a dye cavity, a plurality of outlet orifices and means for causing fluid in said dye cavity to flow outwardly through said outlet orifices, said method comprising the steps of;

immersing said assembly in a cleaning liquid which encompasses at least said liquid outlet orifices;

ultrasonically agitating said liquid; and simultaneously with said agitating step, propelling a stream of cleaning fluid inwardly through said plurality of outlet orifices to propel foreign particles dislodged from said assembly out of said ink jet orifice plate assembly.

10. A method according to claim 9, wherein said step of ultrasonically agitating said cleaning liquid causes ultrasonic vibrations to be imparted to said cleaning liquid at the rate of between 10 and 40 KHz.

11. A method according to claim 9, wherein said step of ultrasonic agitating causes said cleaning liquid to cavitate at or near said outlet orifices.

12. A method according to claim 9 further comprising the steps of heating said cleaning liquid and controlling the temperature of said cleaning liquid during said step of ultrasonically agitating said liquid.

13. A method according to claim 9 further comprising the steps of filtering said stream of liquid propelled through said plurality of orifices and recirculating said filtered liquid to said liquid containing means.

14. A method according to claim 9, wherein said step of immersing said newly assembled assembly is carried out in liquid containing means longer than 1.8 meters.

15. A method according to claim 9, wherein said step of ultrasonic agitating causes ultrasonic vibrations to be imparted to said cleaning liquid at a rate of 16 KHz.

16. An apparatus according to claim 1, wherein said ink jet orifice plate assembly includes an ink stream input passage and said liquid stream propelling means is connectable to said input passage.

17. An apparatus for cleaning foreign particles from an ink jet orifice plate assembly of the type having a dye cavity, a plurality of outlet orifices, and an ink stream input passage, said dye cavity and said input passage being in fluid communication with said outlet orifices and defining a first direction of fluid flow through said orifices, said apparatus comprising:

liquid containing means for containing a quantity of cleaning liquid, said ink jet orifice plate assembly being disposable in said liquid;

ultrasonic agitating means for ultrasonically agitating said liquid; and liquid stream propelling means connectable to said ink jet stream input passage for propelling a stream of said liquid through said plurality of outlet orifices in a second direction of fluid flow, said second direction being opposite of said first direction and out of said ink stream input passage so as to propel foreign particles ultrasonically dislodged from said assembly out of said assembly.

* * * * *